United States Patent

Schlor et al.

[15] 3,687,159
[45] Aug. 29, 1972

[54] SAFETY INSTALLATION AT A MOTOR VEHICLE TANK

[72] Inventors: Egon Schlor, Boblingen; Herbert Duchrau, Sindelfingen, both of Germany

[73] Assignee: Daimler-Benz Aktiengesellschaft, Stuttgart-Unterturkheim, Germany

[22] Filed: June 29, 1970

[21] Appl. No.: 50,606

[30] Foreign Application Priority Data

July 4, 1969  Germany..........P 19 33 960.7

[52] U.S. Cl..............................................137/563
[51] Int. Cl. ...........................................B65d 25/00
[58] Field of Search.......................................137/563

[56] References Cited

UNITED STATES PATENTS

| | | | |
|---|---|---|---|
| 2,367,055 | 1/1945 | Rike et al. | 137/563 |
| 1,013,963 | 1/1912 | Smith | 137/563 |
| 1,933,753 | 11/1933 | Parsons | 137/563 |

*Primary Examiner*—Henry T. Klinksiek
*Attorney*—Craig, Antonelli, Stewart & Hill

[57] ABSTRACT

A safety installation for a motor vehicle fuel tank from which fuel is pumped through a fuel line to the engine which includes a check valve near the fuel tank in the fuel line that opens in the direction of the suction and which includes a check valve in the fuel return line, if such is provided, which opens in the direction of the suction and which includes a check valve in the fuel return line, if such is provided, which opens in the direction of the return feed.

3 Claims, 1 Drawing Figure

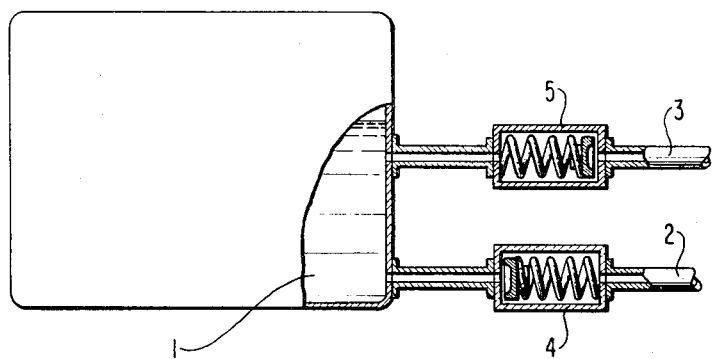

SAFETY INSTALLATION AT A MOTOR VEHICLE TANK

The present invention relates to a safety installation at a motor vehicle fuel tank, from which the fuel is drawn-in with the aid of a pump into a fuel line leading to the engine.

The present invention is concerned with the aim to provide a safety installation in which in case of a break of the fuel line, the fuel line closes immediately.

The underlying problems are solved according to the present invention in a simple manner in that a check valve opening in the suction direction is arranged at the fuel tank.

It is achieved by the present invention that in case of a break of the fuel line at any place between the fuel tank and the engine, the check valve in the absence of suction in the fuel line closes instantaneously the fuel tank and prevents a running out of fuel. The danger of fire is considerably decreased thereby.

According to a further feature and development of the inventive concept with the type of a fuel tank, in which terminates a fuel return line, a check valve opening in the direction of the return feed may be arranged in this return line. In case of a break of the fuel return line, the return feed pressure decreases in this line whence the check valve closes and seals the fuel tank.

Accordingly, it is an object of the present invention to provide a safety installation for a motor vehicle fuel tank which avoids by simple means the aforementioned shortcomings and drawbacks encountered in the prior art.

Another object of the present invention resides in a safety installation for a motor vehicle fuel tank which effectively prevents the running out of fuel out of the tank in case of breakage or leakage in the fuel line.

A further object of the present invention resides in a safety installation of a motor vehicle fuel tank which not only closes the feed line in case of failure or breakage of the line but also seals the tank with respect to the return line in case of failure or breakage in the latter line.

Still another object of the present invention resides in a safety installation in a motor vehicle tank which minimizes the danger of fire as a result of fuel running out of the tank in case of break in the fuel line system.

These and further objects, features and advantages of the present invention will become more obvious from the following description when taken in connection with the accompanying drawing which shows, for purposes of illustration only, one embodiment in accordance with the present invention, and wherein:

The single FIGURE is a schematic view of one embodiment of a safety installation for a fuel tank in accordance with the present invention.

Referring now to the single figure of the drawing, reference numeral 1 designates a conventional fuel tank from which leads a fuel line 2 to the engine (not shown) in a motor vehicle. The fuel is sucked-in by a pump (not shown) arranged in proximity to the engine. A return line 3 leads from the engine to the fuel tank 1 through which excessively supplied fuel is forced back to the fuel tank 1.

In order to prevent, in case of a break of the fuel line 2 and of the return line 3, a flowing out of fuel out of the fuel tank 1, the check valve 4 of conventional construction is arranged in the fuel line 2 in proximity to the fuel tank 1 which opens in the suction direction, whereas the check valve 5 also of conventional construction is provided in the return line 3 in proximity to the fuel tank 1, which opens in the direction of the return feed.

If the suction of the pump becomes ineffectual in the fuel line 2 as a result of a break in this line, then the check valve 4 closes the fuel tank 1. Also the check valve 5 closes the fuel tank 1 if, as a result of a break in the return feed line 3, the return feed pressure can no longer act on the check valve 5.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A safety installation for a motor vehicle fuel tank of the type having fuel sucked by means of a pump into a fuel line system leading to an engine and having a return feed line for returning unused fuel to the fuel tank; said installation comprising: a first check valve means provided in the fuel line system which opens in the suction direction, and a second check valve means provided in the return feed line which opens in the direction of fuel flow in the return feed line, both said first and second check valve means being arranged in proximity to the fuel tank.

2. A safety installation according to claim 1, characterized in that the first check valve means is arranged at the fuel tank.

3. A safety installation according to claim 1, characterized in that the second check valve means is arranged at the fuel tank.

* * * * *